3,828,029
SYNTHESIS OF 14β HYDROXYSTEROIDS
Eliahu Caspi, 1 Ardmore Road, Worcester, Mass. 01609, and Donald J. Aberhart, 1005 Perry St. NE., Washington, D.C. 20017
No Drawing. Continuation-in-part of abandoned application Ser. No. 262,395, June 13, 1972. This application Apr. 3, 1973, Ser. No. 347,597
Int. Cl. C07c 173/00
U.S Cl. 260—239.55 R           14 Claims

ABSTRACT OF THE DISCLOSURE

There is provided a novel method of inserting a 14β-hydroxy group into steroid nuclei unsubstituted at that position and in particular there is provided a method of converting 3,22-dihydroxy-23,24-dinor-5ξ-cholenes or the 3-acylates thereof into the corresponding 3, 14β,22-trihydroxy-23,24-dinor-5ξ-cholanes and the 3,22-diacylates thereof. This method also provides a novel and simple means of synthesizing digitoxigenin.

RELATED APPLICATIONS

This application is a continuation-in-part of copending application, Ser. No. 262,395, filed June 13, 1972, now abandoned.

FIELD OF THE INVENTION

Synthesis of 14β-hydroxy steroids.

DESCRIPTION OF THE PRIOR ART

The important cardiac active steroids possess a 14β-hydroxy group and a ketopyran or ketofuran group at the 17β-position of the steroid nucleus. All of these moieties are known to be sensitive to many reagents generally used in steroid synthesis and it has heretofore been difficult to produce compounds wherein both groups are present. The 14β-hydroxy group has been found particularly difficult to insert. A synthesis of digitoxigenin has been reported by Sondheimer et al. (J.A.C.S. *84*, 876 (1962); Tetrahedron, *22*, 3189 (1966)). This synthesis starts from methyl 3β-acetoxy-14β-hydroxy-5β-etianate which in turn was previously synthesized from 5β-androstan-3β-ol-17-one acetate in a 9-step sequence (Meyer, Helv. Chim. Acta., *29*, 1580 (1946); and Ruzicka et al., ibid., *30*, 1342 (1947)).

It was deemed desirable to find a simpler method of synthesis of digitoxigenin and related compounds than that referred to therein. Such synthetic route should start from cheap and readily available steroidal starting materials and be of fairly wide applicability.

SUMMARY OF THE INVENTION

In the process of the present invention, there is utilized as starting material a 3,22-dihydroxy-23,24-dinor-5ξ-chol-7-ene (III) suitably in the form of the 3-acyl ester. This starting material may be obtained from the corresponding 5-cholesta-7,22-diene 3-ester suitably the acetyl ester (I) which is subjected to selective oxidative cleavage of the $C_{22}$ double bond to yield the corresponding 22-al (II) which in turn is reduced by means well known in the art to yield the starting material (III). The 3-acyloxy-22-hydroxy steroid (III) is treated with a phosphorus trihalide, suitably phosphorus tribromide to yield not the expected 22-bromide compound, but the totally unexpected 14,22-epoxide (IV). The epoxide may also be formed by treatment of steroid (III) with other cyclizing agents such as hydrochloric acid and the like. This epoxide may be readily oxidized by suitable oxidizing agents to yield the corresponding 14β,22-lactone (V). Where it is desired to form the corresponding 14β,22-dihydroxy compound (VII), the lactone is reduced with a strong reducing agent.

Where it is desired to synthesize digitoxigenin, there is used as starting material, a 5β-ergosta-7,22-dien-3β-acylate (a compound of Formula I), the lactone (V) is treated with a suitable Grignard reagent or an organometallic agent suitably an alkali metal aryl or alkyl to give the corresponding 14β-hydroxy-20-disubstituted methylene derivative (VI) which are then readily cleaved by ozonolysis to give the 14β-hydroxy-20-oxo-pregnane-3-acylate, suitably the acetate, that is to say, the known 14β-hydroxy-20-oxo-5β-pregnane-3β-acetate, which may then be converted into digitoxigenin by the method of Sondheimer et al. (vide supra).

The invention described herein was made in the course of work under a grant or award from the Department of Health, Education, and Welfare.

DESCRIPTION OF THE PREFERRED EMBODIMENTS

In the process of the present invention, the starting material, namely the 3,22-dihydroxy-23,24-dinor-5ξ-chol-7-ene (III), suitably in the form of the 3-ester, is obtained from the corresponding -5ξ-ergosta-7,22-diene 3-ester, by oxidative cleavage, and subsequent reduction of the aldehyde thus formed. Any readily available ester may be utilized and the invention is not to be considered limited therein. Among the suitable esters are those of alkanol acids, preferably $C_1$–$C_5$ alkanol acids and arylalkanoic acids such as phenyl- and naphthyl alkanoic acids having 1–5 carbon atoms in the side chain, acetic and benzoic acids are especially preferred. In the preferred modification of this process, the 3-acyl-ergosta-diene is taken up in a suitable solvent such as hydrocarbon or halogenated hydrocarbon suitably methylene chloride or the like and ozonized suitably in the presence of a base, suitably an organic base such as pyridine, until *ca.* 1.5 equivalents of ozone have passed in. The reaction mixture is then worked up in the usual manner, suitably by quenching with methanol and dimethyl sulfide. The mixture is evaporated to dryness redissolved in an alkanol and saturated aqueous sodium bisulfite. The aqueous solution is extracted with ether and the ether discarded. The aqueous phase is made basic and re-extracted with ether to yield on work-up the corresponding 22-al (II). Alternatively the $C_{22}$ double bond could be cleaved by other oxidative methods, for example, using potassium permanganate or osmium tetroxide, with periodic acid. The product may then be reduced to the corresponding 22-hydroxy compound (III).

In the preferred modification this reduction is carried out using a reducing agent such as metal hydrides, their alkoxy analogs or the like such as sodium borohydride, diborane, or the like. It is especially preferred to take up the aldehyde (II) in a mixture of methanol and methylene chloride and treat the same with a solution of sodium borohydride, suitably a 1 to 1.5 molar excess of hydride to yield, upon work-up, the desired compound (III).

The thus produced 3-acyloxy-22-hydroxy-23,24-dinor-5ξ-chol-7-ene is taken up in a solvent, suitably a halohydrocarbon solvent, like methylene chloride, chloroform, carbontetrachloride, or the like, and treated with phosphorous trihalide suitably phosphorous tribromide.

Preferably, the reaction may be carried out at low temperatures, suitably from 0° C. to 30° C., preferably at ambient temperatures for from about 1 to about 72 hours preferably for about 48 hours. The reaction mixture is not worked up in any way, but directly purified by chromatography, suitably thin layer chromatography to yield, upon recrystallization of the eluate, the 14,22-epoxy-23,24-dinor-5ξ-cholan-3-acylate (IV). Alternatively there may be used cyclizing agents such as thionyl halides, phosphorus oxyhalides, perhalic acids and certain Lewis acids, for example, thionyl chloride or bromide, phosphorus oxychloride, perchloric acid, hydrochloric acid or hydrobromic acid, boron trihalides or stannic chloride.

The 14,22-epoxide (IV) is then oxidized with a strong oxidizing agent. It is preferred to take up the epoxide in a nonhydroxylic, polar, organic solvent suitably acetone or the like and treat it with an appropriate oxidizing agent, such as chromic acid, nickel tetroxide, ruthenium tetroxide, freshly prepared ruthenium tetroxide being especially preferred. This reaction can be carried out according to the method previously described by D. M. Piatak et al. (J. Org. Chem. *34*, 116 (1969)).

The reaction mixture is purified by filtration suitably through a material such as celite, the filtrate reduced in volume, diluted with water, and extracted with a water immiscible solvent such as ether to yield, upon evaporation of the ether, the corersponding 14,22-lactone (IV) which may then be further purified as needed.

Where it is desired to synthesize digitoxigenin, the lactone, which in that case would be the 3β-acyloxy-23,24-dinor-5β-cholano-14β,22-lactone (V) is taken up in a suitable solvent, for example, a hydrocarbon solvent such as benzene, toluene or an ethereal solvent such as diethyl ether or tetrahydrofuran which had previously been dried by methods well known in the art. To the reaction mixture is added a slight excess suitably between 3 and 4 moles of an organometallic aryl or alkyl such as lithium butyl, or lithiumphenyl, or the like. While the corresponding Grignard reagents may also be used it has been found more convenient to use the lithium derivatives. The reaction mixture is stirred for from about 30 minutes to about 2 hours. The reaction mixture may be heated under reflux, cooled, and the excess organometallic reagent destroyed and then worked up in the usual manner.

The residue is acylated, suitably acetylated then the acetates are dissolved in a suitable solvent such as benzene, and a small amount of acid, suitably p-toluene sulfonic acid is added and the mixture refluxed for 2–6 hours. After conventional work-up the thus produced 22-disubstituted-20-methylene steroid (VI) is isolated from the residue.

The methylene group may be cleaved by ozonolysis to yield the known 14β-hydroxy-20-ketone (VIII) (Sondheimer, et al. Tetrahedron *22*, 3189 (1966)). While selective ozonolysis is not required in this instance since merely the 22-olefinic group is to be cleaved, nevertheless, it is desirable to utilize mild reaction conditions.

The thus produced 3β-dihydroxy-20-oxo-5β-pregnane-3-acylate may then be converted into digitoxigenin in accordance with the procedure set forth in Sondheimer et al., J.A.C.S., *84*, 875, (1962).

It should be noted that the process of the present invention appears to be dependent on a number of stereochemical factors. It has been found, for example, that where the steroid utilized is 22RS-hydroxy-5α-cholest-7-en-3β-ol, that is to say, that analog of Compound (VII) having an isopentyl moiety attached to the 22-carbon atom, no epoxide is formed but there is obtained a mixture of the corresponding $\Delta^8$ (IX) and $\Delta^{14}$-22-hydroxy derivatives.

The process of this invention is also applicable starting with $\Delta^{8(9)}$, $\Delta^{8(14)}$, and $\Delta^{14}$ steroids of the 5α or 5β series.

FIGURE 1

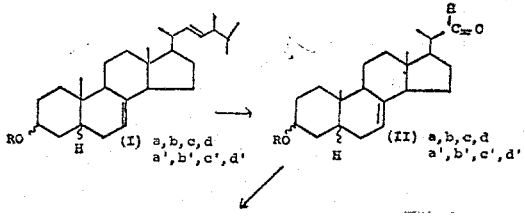

FIGURE 1.—Continued

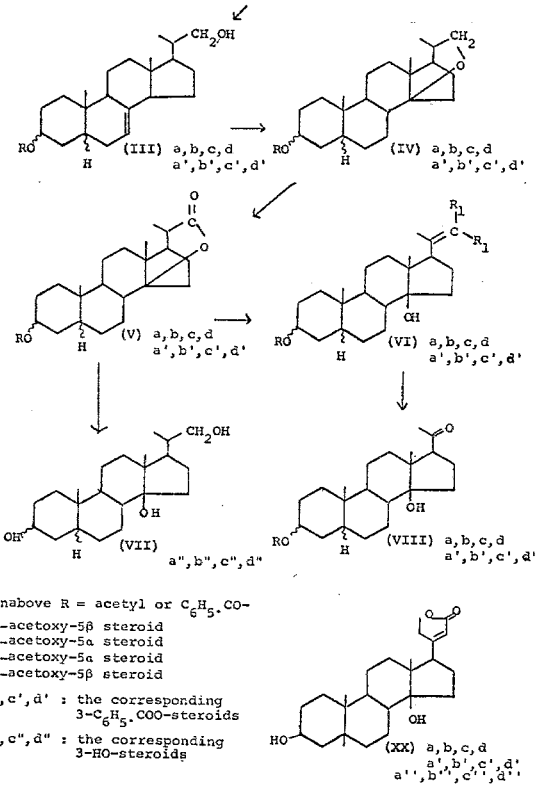

hereinabove R = acetyl or $C_6H_5$·CO-
a: 3α-acetoxy-5β steroid
b: 3α-acetoxy-5α steroid
c: 3β-acetoxy-5α steroid
d: 3β-acetoxy-5β steroid a',b',c',d' : the corresponding 3-$C_6H_5$·COO-steroids a",b",c",d" : the corresponding 3-HO-steroids

FIGURE 2

ALL COMPOUNDS:
a,b,c,d
a',b',c',d'

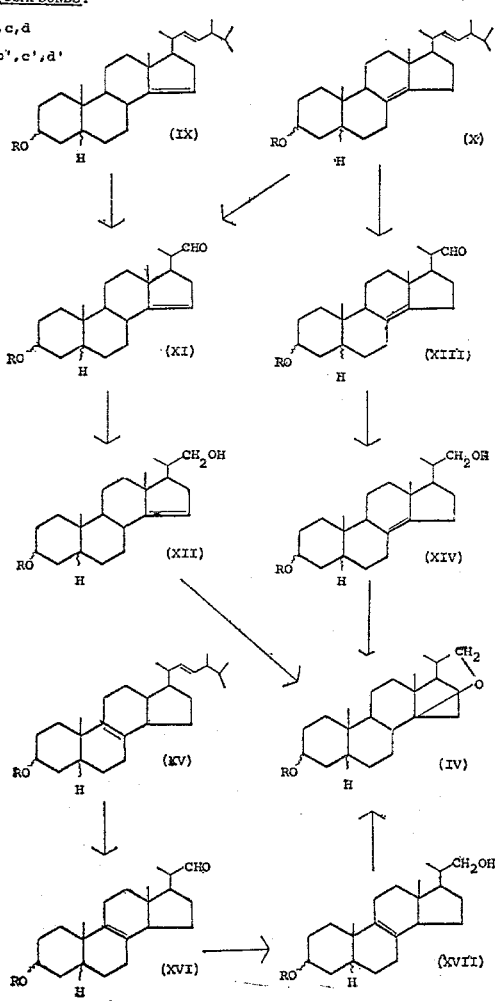

In a manner analogous to that set forth hereinabove, the starting point for the synthetic route using the corresponding $\Delta^{8(9)}$, $\Delta^{8(14)}$, and $\Delta^{14}$ steroids are the corresponding 5ξ-ergosta-8(9)-, 8(14)-, and 14-22-dienes.

Thus, for example, 3-benzoyloxy-5ξ-ergosta-8(9), 22-diene is prepared either by the method of Hallsworth et al. (J. Chem. Soc., 1969, (1957)) or by the method of Barton et al. (J. Chem. Soc., 1771 (1949)). This ergosta diene (XV) is then oxidized by controlled cleavage to yield the aldehyde (XVI) corresponding to the aldehyde (II) in the $\Delta^7$ series. This controlled cleavage may be carried out in a similar manner utilizing as cleavage agents potassium permanganate or osmium tetroxide, in the presence of periodic acid, or by ozonolysis, the latter being preferred.

The aldehyde (XVI) is then reduced using a suitable reducing agent which will not, however, reduce the ester group at the 3- position, for example, sodium borohydride, diborane, or the like may be utilized to yield the corresponding 22 - hydroxy 23,24-dinor-5ξ-chol-8(9)-ene 3-ester (XVIII). The 22-hydroxy steroid (XVIII) is then taken up in a suitable solvent, for example, a halohydrocarbon solvent such as methylene chloride, chloroform, carbon tetrachloride or the like, preferably chloroform and treated with an epoxidizing agent, for example a protic acid, such as the Lewis acid, for example, boron trifluoride, stannic chloride, or the like, or a phosphorus trihalide suitably phosphorus tribromide, phosphorus tribromide in chloroform being especially preferred. The reaction is carried out under the conditions described hereinabove for the transformation of the 22-hydroxy steroid (III) to yield, also in this case, the epoxide (IV).

Similarly, 5ξ-ergost-8(14),22-diene 3-esters (X) are prepared in accordance with the method of Barton et al. (J. Chem. Soc., 1771 (1949)), Fieser and Fieser Steroids, Reinhold Publishing Company, 1959 (p. 114)). In the course of this synthesis, there is also prepared the corresponding 5ξ-ergost-14,22-diene 3-ester, which may be separated therefrom in the manner set forth in the cited reference.

The manner of proceeding to the epoxide (IV) from these materials is analogous to that set forth hereinabove starting with the 5ξ-ergosta-8(9), 22-diene 3-ester (XV), namely the dienes (IX) and (X) are subjected to oxidative cleavage to yield the 22-aldehydes (XI) and (XIII) respectively, which in turn are reduced to the corresponding 22-alcohols (XII) and (XIV). These are then subjected to epoxidation to yield the epoxide (IV) by subjecting them to the reagents set forth hereinabove in the manner set forth hereinabove.

The esters utilized herein are analogous to the esters utilized in the $\Delta^7$ sequence described hereinabove.

EXPERIMENTAL PROCEEDINGS

Melting points are taken on a hot stage and are corrected. Specific rotations are determined for 1–2% solutions in chloroform. Silica gel Merck HF$_{254+366}$ is used for thin layer chromatography (t.l.c.). Infrared spectra are determined as pressed disks in KBr on a Perkin-Elmer 237 instrument. U.V. spectra are taken in methanol solution on a Perkin-Elmer 202 instrument. N.m.r. spectra are determined on a Varian HA–60 instrument operating at 60 mHz., using CDCl$_3$ as solvent, unless otherwise stated. Chemical shifts are quoted in δ (p.p.m.) relative to an internal standard of tetramethyl silane. Mass spectra are taken on a Varian M–66 instrument. In certain cases precise masses are determined on spectra obtained on a Varian M–66 instrument. High resolution mass spectra were obtained on the NIH facility operated by Arthur D. Little Co., Cambridge, Mass.

EXAMPLE I

3α-Acetoxy-22-hydroxy-23,24-dinor-5β-chol-7-ene (III)a

A cooled (−78°) solution of 3α-acetoxy-5β-ergosta-7, 22-diene (I)a (9.09 g.) in CH$_2$Cl$_2$ (400 ml.) and pyridine (2.5 ml.) is treated with O$_3$ (1.5 equivalents) which is passed in at a rate of 42.5 mg. O$_3$ per min. (determined iodometrically). Methanol (5 ml.) and dimethylsulfide (5 ml.) are added, and the solution allowed to warm to room temperature. The mixture is then evaporated to dryness in a stream of nitrogen.

The residue is dissolved in methanol (80 ml.), and treated with 50 ml. of saturated aqueous sodium hydrogen sulfite. After shaking for 10 min., the viscous mixture is extracted with 4× 250 ml. ether, centrifuging after each extraction 5 min. at 500 r.p.m. The ether extract is dried and evaporated to yield mainly recovered starting material (3.5 g.).

Then the aqueous phase is neutralized with aqueous sodium hydroxide, and treated with 20 ml. of saturated sodium carbonate. The solution is extracted with 4× 250 ml. ether, centrifuging as before. The ether extract is dried over sodium sulfate and evaporated. The major product is isolated by prep. t.l.c. (system 10% ethyl acetate-hexane; (R$_f$ 0.5)) giving 2.07 g. of the aldehyde (II)a, which is recrystallized from MeOH, m.p. 90–92°, [α]$_D^{20}$+74° (c., 2.22), ν$_{max}$ 2680, 1730, 1720, 1255, 1125 cm.$^{-1}$; n.m.r. bands at 0.61 (18-Me), 0.88 (19-Me), 1.15 (3H, d, J∼6 c.p.s., 21-Me), 2.0 (OAc), 4.72 (1H, m, 3β-H), 5.13 (1H, m, vinylic), 9.57 (1H, d, J∼3 c.p.s., CHO); extraneous peaks at 3.42 and 0.57 indicated an impurity. The mass spectrum has peaks at m/e 312 (M—CH$_3$CO$_2$H), 297 (M—(CH$_3$CO$_2$H+CH$_3$)), 284 and 269.

The aldehyde (II)a (1.92 g.) is then dissolved in chloroform (25 ml.) and methanol (25 ml.) and treated with sodium borohydride (300 mg.) at room temperature for 1 hour. Ammonium chloride (1 g.) in H$_2$O (100 ml.) is added, and the mixture is extracted with chloroform. The chloroform extract is dried, evaporated, and the crude product separated by prep. t.l.c. (25% ethyl acetate-hexane). The major product, R$_f$ 0.5), 1.25 g. is isolated and recrystallized from chloroform-methanol in prisms, to yield 3α - acetoxy-22-hydroxy-23,24-dinor-5β-chol-7-ene (III)a, m.p. 132–133°, [α]$_D^{22}$ +83°; ν$_{max}$ 3560, 3400 (br), 1720, 1250 cm.$^{-1}$; n.m.r. bands at 0.57 (18-Me), 0.87 (19-Me), 1.05 (3H, d, J=6 c.p.s., 21-Me), 1.62 (1H, D$_2$O exchangeable, —OH), 1.99 (OAc), 3.53 (2H, m, —CH$_2$OH), 4.68 (1H, m, 3β—H), 5.25 (1H, m, vinylic). The mass spectrum gives a low intensity peak at m/e 374 (M+, C$_{24}$H$_{38}$O$_3$) and peaks at 314

(base peak, M—CH$_3$CO$_2$H)

and 299 (M—CH$_3$CO$_2$H—CH$_3$).

In accordance with the above procedure, but starting with 3α-acetoxy-5α-ergosta-7,22-diene (I)b, 3β-acetoxy-5α-ergosta-7,22-diene (I)c, 3β - acetoxy-5β-ergosta-7,22-diene (I)d in place of 3α - acetoxy - 5β - ergosta-7,22-diene (I)a, there is obtained the corresponding 3α-acetoxy-22-hydroxy - 23,24 - dinor-5α-chol-7-ene (III)b,3β-acetoxy-22-hydroxy - 23,24 - dinor-5α-chol-7-ene (III)c, 3β - acetoxy-22-hydroxy-23,24-dinor-5β-chol-7-ene (III)d. Similarly, but using the 3-benzoyloxy derivative in place of the 3-acetoxy derivative there is obtained the corresponding 3-benzoyloxy derivative.

In accordance with the above procedure but starting with:

3α-acetoxy-5α-ergosta-8(9),22-diene
3α-acetoxy-5β-ergosta-8(9),22-diene
3β-acetoxy-5α-ergosta-8(9),22-diene
3β-acetoxy-5β-ergosta-8(9),22-diene
3α-acetoxy-5α-ergosta-8(14),22-diene
3α-acetoxy-5β-ergosta-8(14),22-diene
3β-acetoxy-5α-ergosta-8(14),22-diene
3β-acetoxy-5β-ergosta-8(14),22-diene
3α-acetoxy-5α-ergosta-14,22-diene
3α-acetoxy-5β-ergosta-14,22-diene
3β-acetoxy-5α-ergosta-14,22-diene
3β-acetoxy-5β-ergosta-14,22-diene instead of 3α-acetoxy-5β-ergosta-7,22-diene I(a), there is obtained, respectively, the corresponding:

3α-acetoxy-22-hydroxy-23,24-dinor-5β-chol-8(9)-ene
3α-acetoxy-22-hydroxy-23,24-dinor-5β-chol-8(9)-ene
3β-acetoxy-22-hydroxy-23,24-dinor-5α-chol-8(9)-ene
3β-acetoxy-22-hydroxy-23,24-dinor-5β-chol-8(9)-ene
3α-acetoxy-22-hydroxy-23,24-dinor-5α-chol-8(14)-ene
3α-acetoxy-22-hydroxy-23,24-dinor-5β-chol-8(14)-ene
3β-acetoxy-22-hydroxy-23,24-dinor-5α-chol-8(14)-ene
3β-acetoxy-22-hydroxy-23,24-dinor-5β-chol-8(14)-ene
3α-acetoxy-22-hydroxy-23,24-dinor-5α-chol-14-ene
3α-acetoxy-22-hydroxy-23,24-dinor-5β-chol-14-ene
3β-acetoxy-22-hydroxy-23,24-dinor-5α-chol-14-ene
3β-acetoxy-22-hydroxy-23,24-dinor-5β-chol-14-ene Similarly, but using the 3-benzoyloxy derivative in place of 3-acetoxy derivative, there is obtained the corresponding 3-benzoyloxy derivative.

EXAMPLE II

3α-Acetoxy-14,22-epoxy-23,24-dinor-5β-cholane (IV)a

A solution of 0.0845 ml. phosphorus tribromide in 50 ml. chloroform is prepared. To 36 ml. of this solution is added 705 mg. of 3α-acetoxy-22-hydroxy-23,24-dinor-5β-chol-7-ene (III)a and the mixture is kept at room temperature for 48 hours. The solution is washed with sodium bicarbonate, dried over sodium sulfate and evaporated. The crude product is purified by preparative t.l.c., giving 530 mg. of 3α - acetoxy-14,22-epoxy-23,24-dinor-5β-cholane (IV)a, recrystallized from methanol as prisms, m.p. 139–141°, $[\alpha]_D^{22}$ —9° (c., 2.00), $\nu_{max}$ 1725, 1230, 1220, 1010 cm.$^{-1}$, n.m.r. bands at 0.68 (3H, α, J=6 c.p.s., 21-Me) 0.92 (19-Me), 1.02 (18-Me), 2.03 (OAc); part of an ABX pattern (2H) between 3.0 and 3.83, with $J_{AB}$=11.0 c.p.s., $J_{BX}$=11.0 c.p.s. and $J_{AX}$=6.0 c.p.s.; 4.72 (1H, m, 3β-H). The mass spectrum exhibits intense peaks at m/e 374.2813 (M$^+$, calcd. for $C_{24}H_{38}O_3$ (374.2821) and m/e 359 (base peak).

In accordance with the above procedure but starting with:

3α-acetoxy-22-hydroxy-23,24-dinor-5α-chol-8(9)-ene
3α-acetoxy-22-hydroxy-23,24-dinor-5β-chol-8(9)-ene
3β-acetoxy-2-hydroxy-23,24-dinor-5α-chol-8(9)-ene
3β-acetoxy-22-hydroxy-23,24-dinor-5β-chol-8(9)-ene
3α-acetoxy-22-hydroxy-23,24-dinor-5α-chol-8(14)-ene
3α-acetoxy-22-hydroxy-23,24-dinor-5β-chol-8(14)-ene
3β-acetoxy-22-hydroxy-23,24-dinor-5α-chol-8(14)-ene
3β-acetoxy-22-hydroxy-23,24-dinor-5β-chol-8(14)-ene
3α-acetoxy-22-hydroxy-23,24-dinor-5α-chol-14-ene
3α-acetoxy-22-hydroxy-23,24-dinor-5β-chol-14-ene
3β-acetoxy-22-hydroxy-23,24-dinor-5α-chol-14-ene
3β-acetoxy-22-hydroxy-23,24-dinor-5β-chol-14-ene in place of 3α-acetoxy-22-hydroxy-23,24-dinor-5β-chol-7-ene, there is obtained, respectively, the corresponding 3α-acetoxy-14,22-epoxy-23,24-dinor-5α-cholane
3α-acetoxy-14,22-epoxy-23,24-dinor-5β-cholane
3β-acetoxy-14,22-epoxy-23,24-dinor-5α-cholane
3β-acetoxy-14,22-epoxy-23,24-dinor-5β-cholane
3α-acetoxy-14,22-epoxy-23,24-dinor-5α-cholane
3α-acetoxy-14,22-epoxy-23,24-dinor-5β-cholane
3β-acetoxy-14,22-epoxy-23,24-dinor-5α-cholane
3β-acetoxy-14,22-epoxy-23,24-dinor-5β-cholane
3α-acetoxy-14,22-epoxy-23,24-dinor-5α-cholane
3α-acetoxy-14,22-epoxy-23,24-dinor-5β-cholane
3β-acetoxy-14,22-epoxy-23,24-dinor-5α-cholane
3β-acetoxy-14,22-epoxy-23,24-dinor-5β-cholane Similarly, but using the 3-benzoyloxy derivative in place of the 3-acetoxy derivative, there is obtained the corresponding 3-benzoyloxy derivative.

EXAMPLE III

3β-Acetoxy-14,22-epoxy-23,24-dinor-5β-cholane (IV)d

A solution of 0.0845 ml. phosphorus tribromide in 50 ml. chloroform is prepared. To 36 ml. of this solution is added 705 mg. of 3β-acetoxy-22-hydroxy-23,24-dinor, 5β-chol-7-ene (III)d and the mixture is kept at room temperature for 48 hours. The solution is washed with sodium bicarbonate, dried sodium sulfate and evaporated. The crude product is purified by preparative t.l.c. giving 3β-acetoxy-14,22-epoxy, 23,24-dinor-5β-cholane (IV)d which is recrystallized from methanol.

In accordance with the above product but where, in place of phosphorus tribromide there is used anhydrous hydrogen chloride, perchloric acid or thionyl chloride is obtained the same product.

EXAMPLE IV

3β-Benzoyloxy-14,22-epoxy-23,24-dinor-5α-cholane-(IV)c'

3β-Benzoyloxy-22-hydroxy-23,24-dinor-5α-chol - 7-ene (III)c' (79 mg.) is treated with 3.15 mg. (1 equiv.) of a solution of 0.0181 ml. phosphorus tribromide in 10 mg. chloroform, at room temperature for 18 hours. The solution is directly separated, without preliminary workup, by prep. t.l.c. (20% ethyl acetate-hexane; $R_f$ 0.7) giving 3β-benzoyloxy-14,22-epoxy-23,24-dinor-5α - cholane (IV)c' (52.5 mg.) which is recrystallized from chloroform-methanol, needles, m.p. 190–191°, $[\alpha]_D^{20}$ —27° (c., 1.71), $\nu_{max}$ 1715, 1480, 1450, 1275, 1115, 710 cm.$^{-1}$; n.m.r. bands at 0.68 (3H, d, J=6 c.p.s., 21-Me). 0.88 (19-Me), 103 (18-Me), 4.91 (1H, m, 3α-H); part of an ABX pattern (2H) appears between δ 3.12 and 3.83 with calculated $J_{AX}$=6.5 c.p.s., $J_{BX}$=11.0 c.p.s., and $J_{AB}$=11.0 c.p.s. The mass spectrum exhibits major peaks at m/e 436 (M$^+$, $C_{29}H_{40}O_3$), 421 (base peak), 314 (M—$C_6H_5CO_2H$). Anal. Calcd. for $C_{29}H_{40}O_3$: C, 79.75; H, 9.25. Found C, 79.75; H, 8.85.

EXAMPLE V

3α-Benzoyloxy-14,22-epoxy-23,24-dinor-5α-cholane-(IV)b'

3α-Benzoyloxy-22-hydroxy-23,24-dinor-5α-chol - 7 - ene (III)b' (79 mg.) is treated with 3.15 ml. (1 equiv.) of a solution of 0.0181 ml. phosphorus tribromide in 10 ml. chloroform, at room temperature for 18 hours. The solution is directly separated, without preliminary workup, by prep. t.l.c. (20% ethyl acetate-hexane) giving 3α-benzoyloxy-14,22-epoxy-23,24-dinor-5α - cholane (IV)b' (52.5 mg.) which is recrystallized from chloroform-methanol.

EXAMPLE VI

3α-Acetoxy-23,24-dinor-5β-cholano-22→14-lactone (V)a

The 5β-epoxide (IV)a (210 mg.) is stirred at room temperature with 40 mg. ruthenium dioxide and sodium periodate (1.0 g.) in 15 ml. water and 30 ml. acetone for 18 hours. The mixture is diluted with water and extracted with ether. The ether extract is washed with water, sat. sodium chloride, dried ($Na_2SO_4$), and evaporated. The lactone is purified by preparative t.l.c. (10% ethyl acetate-hexane; $R_f$ 0.3) giving 184 mg. of 3α-acetoxy-23,24-dinor-5β-cholano - 22→14 - lactone (V)a, recrystallized from methanol, m.p. 179–181°, $[\alpha]_D^{20}$ —36° (c. 3.05), $\nu_{max}$ 1725, 1720, 1230, 1130, 1015, 975 cm.$^{-1}$, n.m.r. bands at 0.97 (19-Me), 1.07 (18-Me), 1.23 (3H, d, J~7 c.p.s., 21-Me), 2.03 (OAc), 290 (1H, m, C–20 H), 4.68 (1H, m, 3β-H). The mass spectrum exhibits a peak for the molecular ion at m/e 388.2602 (M$^+$, calcd. for $C_{24}H_{38}O_3$(388.2613)), and low intensity peaks at m/e 360 (M—CO), 344 (M—$CO_2$), 328 (M—$CH_3CO_2H$). Intense fragments appear at m/e 292 (M—$C_6H_8O$), and m/e 284 (M—($CH_3CO_2H$+$CO_2$)).

EXAMPLE VII

3β-Acetoxy-23,24-dinor-5β-cholano-22→ 14-lactone (V)d

The 5β-epoxide (IV)d (210 mg.) is stirred at room temperature with 40 mg. ruthenium dioxide and sodium periodate (1.0 g.) in 15 ml. water and 30 ml. acetone for 18 hours. The mixture is diluted with water and extracted with ether. The ether extract is washed with water, sat. sodium chloride, dried (Na$_2$SO$_4$) and evaporated. The lactone is purified by preparative t.l.c. (10% ethyl acetate-hexane), giving 3β-acetoxy-23,24-dinor-5β-cholano-22→14-lactone (V)d, recrystallized from methanol.

EXAMPLE VIII

3β-Benzoyloxy-23,24-dinor-5β-cholano-22→14-lactone-(V)c′

Ruthenium dioxide (5 mg.) in acetone (2 ml.) is treated with sodium periodate (22 mg.) dissolved in acetone-water (1:1, 2 ml.). The yellow solution is added to epoxide (IV)c′ (25 mg.) in acetone (2 ml.) and the mixture is stirred at room temperature. As the solution turns black, a solution sodium periodate (100 mg.) in acetone-water (1:1, 1 ml.) is added in portions over 3 hours. After a total of 5 hours, i-propanol (2 ml.) is added, and stirring continued for 1 hour. The mixture is filtered through Celite, evaporated to half volume, diluted with water, and extracted with ether. The extract is washed with water, dried and evaporated.

The product is purified by prep. t.l.c. (10% ethyl acetate-hexane; R$_f$ 0.15), giving 3β-benzoyloxy-23,24-dinor-5β-cholano - 22→14 - lactone (V)c′ recrystallised from chloroform-methanol, prisms, (20 mg.). m.p. 227–232°, [α]$_D^{20}$ +12° (c., 1.96), $\nu_{max}$ 1720, 1275 cm.$^{-1}$; n.m.r. bands at 0.93 (19-Me), 1.10 (18-Me), 1.27 (3H, d, J~6 c.p.s., 21-Me), 2.97 (1H, m, C–20–H), 4.93 (1H, m, 3α-H). The mass spectrum has peaks at m/e 450.2783 (M$^+$, calcd. for C$_{29}$H$_{38}$O$_4$ 450.2770), 422.2815 (M—CO; calcd. for C$_{28}$H$_{38}$O$_3$ 423.2821), 406.2873 (M—CO$_2$; calcd. for C$_{28}$H$_{38}$O$_2$ 406.2872) 354 (M—C$_6$H$_8$O, base peak), 328 (M—C$_6$H$_5$CO$_2$H).

EXAMPLE IX

3α-Benzoyloxy-23,24-dinor-5α-cholano-22→14-lactone (V)b′

Ruthenium dioxide (5 mg.) in acetone (2 ml.) is treated with sodium periodate (22 mg.) dissolved in acetone-water (1:1, 2 ml.). The yellow solution is added to epoxide (IV)b′ (25 mg.) in acetone (2 ml.) and the mixture stirred at room temperature. As the solution turns black, a solution of sodium periodate (100 mg.) in acetone-water (1:1. 1 ml.) is added in portions over 3 hours. After a total of 5 hours, i-propanol (2 ml.) is added, and stirring continued for 1 hour. The mixture is filtered through Celite, evaporated to half volume. diluted with water, and extracted with ether. The extract is washed with water, dried and evaporated. The product is purified by prep. t.l.c. (10% ethyl acetate/hexane) to yield, upon crystallization from chloroform/methanol 3α-benzoyloxy-23,24-dinor-5α-cholano-22→14-lactons (V)b′.

EXAMPLE X

3α,14β,22-trihydroxy-23,24-dinor-5β-cholane (VII)a″

Lactone (V)a (68 mg.) in ether (50 ml.) is treated with lithium aluminum hydride (500 mg.) at reflux for 24 hours. The excess hydride is destroyed with ethyl acetate, then water is added dropwise until a white granular precipitate is formed. This is filtered and washed with ether. The combined ether solution is dried over Na$_2$SO$_4$, and evaporated. The product 3α,14β,22-trihydroxy-23,24-dinor-5β-cholane (VII)a″, 60 mg. is recrystallized from ethyl acetate to m.p. 195–197° (needles), [α]$_D^{20}$ +18° (c., 1.74), n.m.r. (DMSO —d$_6$) bands at 0.85 (19-Me), 0.93 (18-Me), ca. 0.93 (21-Me, under 18-Me signal), 3.25 (1H, m, 3β-H), 3.35 (2H, D$_2$O exchangeable, —OH), 3.92 (1H, D$_2$O exchangeable, —OH), 4.38 (2H, m, C–22–H$_2$). The mass spectrum exhibits a low molecular ion peak at m/e 350 (C$_{22}$H$_{38}$O$_3$) and major peaks at m/e 338 (M—H$_2$O), 317

(M—(H$_2$O+CH$_3$))

314 (M—2H$_2$O), 299 (M—(2H$_2$O+CH$_3$)), 274

(M—(C$_3$H$_6$O+H$_2$O))

273 (M—(C$_3$H$_7$O+H$_2$O)), 255 (M—C$_3$H$_7$O+2H$_2$O)).

EXAMPLE XI

3β,14β,22-trihydroxy-23,24-dinor-5β-cholane (VIII)d″

Lactone (V)d (68 mg.) in ether (50 ml.) is treated with lithium aluminum hydride (500 mg.) at reflux for 24 hours. The excess hydride is destroyed with ethyl acetate, then water is added dropwise until a white granular precipitate is formed. This is filtered and washed with ether. The combined ether solution is dried over Na$_2$SO$_4$, and evaporated. The product is recrystallized from ethyl acetate to yield 3β,14β,22-trihydroxy-23,24-dinor-5β-cholane (VII)d″.

EXAMPLE XII

3α,14β,22-trihydroxy-23,24-dinor-5α-cholane (VII)b″

Lactone (V)b′ (68 mg.) in ether (50 ml.) is treated with lithium aluminum hydride (500 mg.) at reflux for 24 hours. The excess hydride is destroyed with ethyl acetate, then water is added dropwise until a white granular precipitate is formed. This is filtered and washed with ether. The combined ether solution is dried over Na$_2$SO$_4$, and evaporated. The product is recrystallized from ethyl acetate to yield 3α,14β,22-trihydroxy-23,24-dinor-5α-cholane (VII)b″.

EXAMPLE XIII

3β,14β,22-trihydroxy-23,24-dinor-5α-cholane (VII)c″

Lactone (V)c′ (68 mg.) in ether (50 ml.) is treated with lithium aluminum hydride (500 mg.) at reflux for 24 hours. The excess hydride is destroyed with ethyl acetate then water is added dropwise until a white granular precipitate is formed. This is filtered and washed with ether. The combined ether solution is dried over sodium sulfate and evaporated. The product is recrystallized from ethyl acetate to yield 3β,14β,22-trihydroxy-23,24-dinor-5α-cholane (VII)c″.

EXAMPLE XIV

3β-Acetoxy-14β-hydroxy-23,24-dinor-22-diphenyl-5β-chol-20-ene (VI)d

Lactone (V)d (68 mg.) in ether (50 ml.) is treated with phenyl lithium (500 mg.) at ambient temperature followed by reflux for 2–8 hrs. The reaction mixture is worked up in the usual manner to yield an ether solution. The ether solution is dried over sodium sulfate and evaporated, and the residue acetylated in the usual manner. The obtained acetate is dissolved in benzene, several crystals of p-toluenesulfonic acid are added and the mixture refluxed for 2–6 hrs. The solution is washed and taken to dryness to yield 3β-acetoxy-14β-hydroxy-23,24-dinor-22-diphenyl-5β-chol-20-ene (VI)d.

In accordance with the foregoing procedure but using butyl lithium in place of phenyl lithium there is obtained the 3β-acetoxy-14β-hydroxy - 23,24 - dinor-22-dibutyl-5β-chol-20-ene (VI)d.

EXAMPLE XV

3β-Acetoxy-14β-hydroxy-20-oxo-5β-pregnane (VIII)d

3β-Acetoxy-14β - hydroxy - 23,24 - dinor-22-diphenyl-5β-chol-22-ene (VI)d (213 mg.) in methylene chloride (100 ml.) are treated at —78° with ozone.

Water is added and the mixture is shaken for 2–16 hrs. at room temperature. The organic phase is washed with sat. sodium chloride, dried over sodium sulfate, and evaporated. The major product 3β-acetoxy-14β-hydroxy-20-oxo-5β-pregnane is isolated by preparative t.l.c. (20% ethyl acetate-hexane), and is recrystallized from methanol m.p. 150–151, $[\alpha]_D^{22}$ +25° ($CHCl_3$), $\nu_{max}$ 1727, 1697 cm.$^{-1}$.

In accordance with the foregoing procedure but starting with 3β-acetoxy-14β-hydroxy-22-dibutyl-5β-pregn-20-ene, there is obtained the same product.

EXAMPLE XVI

3β-Benzoyloxy-22-hydroxy-23,24-dinor-5α-chol-8(9)-ene (XVII)c′

A cooled (78°) solution of 3β-benzoyloxy-5α-ergosta-8(9), 22-diene(XV)c′ (9.09 g.) in methylene chloride (400 ml.) and pyridine (2.5 ml.) is treated with ozone (1.5 equivalents) which is passed in at a rate of 42.5 mg. ozone per min. (determined iodometrically). Methanol (5 ml.) and dimethylsulfide (5 ml.) are added, and the solution allowed to warm to room temperature. The mixture is then evaporated to dryness in a stream of nitrogen.

The residue is dissolved in methanol (80 ml.) and treated with 50 ml. of saturated aqueous sodium hydrogen sulfite. After shaking for 10 min., the viscous mixture is extracted with 4× 250 ml. ether, centrifuging after each extraction 5 min. at 500 r.p.m. The ether extract is dried and evaporated to yield mainly recovered starting material (3.5 g.).

Then the aqueous phase is neutralized with aqueous sodium hydroxide, and treated with 20 ml. of saturated sodium carbonate. The solution is extracted with 4× 250 ml. ether, centrifuging as before. The ether extract is dried over sodium sulfate and evaporated. The aldehyde (XVI) is isolated by preparative thin layer chromatography.

The aldehyde (XVI) (1.92 g.) is then dissolved in chloroform (25 ml.) and methanol (25 ml.) and treated with sodium borohydride (300 mg.) at room temperature for 1 hour. Work-up in the usual manner gives the desired 3β-benzoyloxy-22-hydroxy-23,24-dinor-5α-chol-8(9)-ene (XVII)c′, which is recrystallized from chloroform-methanol.

EXAMPLE XVII

3β-Benzoyloxy-14,22-epoxy-23,24-dinor-5α-cholane (IV)c from (XVII)c′

3β-Benzoyloxy-22-hydroxy-23,24-dinor-5α-chol-8(9)-ene (XVII)c′ (79 mg.) is treated with 3.15 ml. of a solution of 0.0181 ml. phosphorus tribromide in 10 ml. chloroform at room temperature for 18 hours. Work-up as in Example IV gave 3β-benzoyloxy-14,22-epoxy-23,24-dinor-5α-cholane (IV)c identical with that prepared from (III)c.

EXAMPLE XVIII

3β-Benzoyloxy-22-hydroxy-23,24-dinor-5α-chol-8(14)-ene (XIV)c′

The 3β-benzoyloxy 5α-ergosta-8(14),22-diene (X)c′ is ozonized and processed as described in Example XVI to yield the corresponding 3β - benzoyloxy - 22 - aldehyde (XIII). The aldehyde (XIII)c′ is dissolved in chloroform-methanol and reduced in accordance with the method of Example XVI to yield 3β-benzoyloxy-22-hydroxy-23,24-dinor-5α-chol-8(14)-ene (XIV)c′.

EXAMPLE XIX

3β-Benzoyloxy-14,22-epoxy 23,24-dinor-5α-cholane (IV)c from (XIV)c′

3β - Benzoyloxy-22-hydroxy-23,24-dinor-5α-chol-8(14)-ene (XIV)c′ (79 mg.) is treated with 3.15 ml. of a solution of 0.0181 ml. phosphorus tribromide in 10 ml. chloroform at room temperature for 18 hours. Work-up as in Example IV gave 3β-benzoyloxy-14,22-epoxy-23,24-dinor-5α-cholane (IV)c identical with that prepared from (III)c.

EXAMPLE XX

3β-Benzoyloxy-22-hydroxy-22,23-dinor-5α-chol-14-ene (XII)c′

A solution of 3β - benzoyloxy - 5α-ergosta-14,22-diene (IX)c′ is ozonized and then processed as described in Example XVI to yield the corresponding 3β-benzoyloxy-22-aldehyde (XI). The aldehyde (XI) is dissolved in chloroform-methanol then reduced and processed as described in Example XVI to yield the corresponding 3β-benzoyloxy - 22 - hydroxy - 23,24-dinor-5α-chol-14-ene (XII)c′.

EXAMPLE XXI

3β-Benzoyloxy-14,22-epoxy-23,24-dinor-5α-cholane-(IV)c from (XII)c′

3β - Benzoyloxy-22-hydroxy-23,24-dinor-5α-chol-14-ene (XII)c′ (79 mg.) is treated with 3.15 ml. of a solution of 0.0181 ml. phosphorus tribromide in 10 ml. chloroform at room temperature for 18 hours. Work-up as in Example IV gave 3β-benzoyloxy-14,22-epoxy-23,24-dinor-5α-cholane (IV)c identical with that prepared from (III)c′.

EXAMPLE XXII

In accordance with the procedures of Examples XVI through XXI, but where in place of 3β-benzoyloxy-5α-ergosta-Q,22-dienes, where Q is 8(9), 8(14), or 14, there are utilized the corresponding 3α-benzoyloxy-5α-ergosta dienes, 3α-benzoyloxy-5β-ergosta dienes, 3β-benzoyloxy-5β-ergosta dienes, 3α-acetoxy-5α-ergosta dienes, 3β-acetoxy-5α-ergosta dienes, 3α-acetoxy-5β-ergosta dienes, 3β-acetoxy-5β-ergosta dienes or any of the other 5ζ-ergosta diene 3ζ-esters defined hereinabove, there are obtained the corresponding 14,22 - epoxy - 23,24-dinor-5ζ-cholane-3ζ-esters (IV).

We claim:
1. In the process of synthesizing digitoxigenin the steps of sequentially reacting a 3-acyloxy-22-hydroxy-23,24-dinor-chol-Q-ene wherein Q is 7, 8, 8(14) or 14 with
    (a) an ether forming agent selected from the group consisting of hydrohalic acids, perchloric acids, thionyl halides and phosphorus trihalides and phosphorus oxyhalides.
    (b) an oxidizing agent selected from the group consisting of chromic acid, nickel tetroxide, and ruthenium tetroxide
    (c) an alkyl or aryl organometallic compound selected from the group consisting of lithium alkyls, lithium aryls, alkyl magnesium halides, aryl magnesium halides, and magnesium, and
    (d) ozone
to yield the corresponding 3-acyloxy-14β-hydroxy-20-oxo-pregnane.

2. In the process according to Claim 1 utilizing as the ether forming agent, a phosphorus trihalide to yield the corresponding 3-acyloxy-14β-hydroxy-20-oxopregnane.

3. In the process according to Claim 1 the steps comprising reacting a 3-alkanoyloxy or 3-aralkanoyloxy-22-hydroxy-23,24-dinor-chol-Q-ene wherein Q is 7, 8, 8(14) or 14 with
    (a) phosphorus tribromide
    (b) ruthenium tetroxide
    (c) lithium butyl or lithium phenyl
    (d) ozone
to yield the corresponding 3-alkanoyloxy or 3-aralkanoyloxy-14β-hydroxy-20-oxopregnane.

4. The steps of Claim 2 wherein Q is 7.
5. The steps of Claim 3 wherein Q is 7.
6. In the process of synthesizing digitoxigenin the steps of sequentially reacting a 3-acyloxy-22-hydroxy-23,24-dinorchol-Q-ene wherein Q is 7, 8, 8(14) or 14 with
    (a) an ether forming agent selected from the group consisting of hydrohalic acids, perchloric acids, thionyl halides and phosphorus trihalides and phosphorus oxyhalides, and
(b) an oxidizing agent selected from the group consisting of chromic acid, nickel tetroxide, and ruthenium tetroxide
to yield the corresponding 3-acyloxy-23,24-dinor-cholano-22→14-lactone.

7. In the process according to Claim 6 utilizing as the ether forming agent, a phosphorus trihalide to yield the corresponding 3-acyloxy-23,24-dinor-cholano-22→14-lactone.

8. In the process according to Claim 7 the steps comprising reacting a 3-alkanoyloxy or aralkanoyloxy-22-hydroxy-23,24-dinor-chol-Q-ene wherein Q is 7, 8, 8(14) or 14 with
(a) phosphorus tribromide and
(b) ruthenium tetroxide
to yield the corresponding 3-alkanoyloxy or 3-aralkanoyloxy-23,24-dinor-cholano-22→14-lactone.

9. In the process according to Claim 7 the steps comprising sequentially reacting a 3-acyloxy-22-hydroxy-23,24-dinor-chol-ene with
(a) a phosphorus trihalide, and
(b) an oxidizing agent selected from the group consisting of chromic acid, nickel tetroxide, and ruthenium tetroxide
to yield the corresponding 3-acyloxy-23,24-dinor-cholano-22→14-lactone.

10. In the process according to Claim 8 the steps comprising sequentially reacting a 3 - alkanoyloxy or 3-aralkanoyl-22-hydroxy-23,24-dinor-5β-chol-ene with
(a) phosphorus tribromide,
(b) ruthenium tetroxide
to yield the corresponding 3-alkanoyloxy or 3-aralkanoyloxy-23,24-dinor-cholano-22→14-lactone.

11. In the process of Claim 6 the step comprising reacting a 3 - acyloxy - 22 - hydroxy-23,24-dinor-chol-7-ene with a phosphorus trihalide.

12. A compound of the general formula

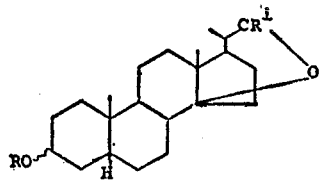

wherein R is alkanoyl or aralkanoyl, and $R^1$ is $H_2$ or $=O$.

13. A compound of the general formula

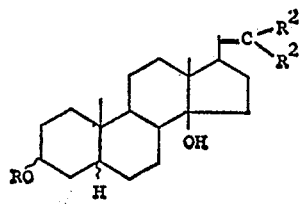

wherein R is alkanoyl, or aralkanoyl, and $R^2$ is alkyl, aralkyl, aryl or alkaryl.

14. A compound of the general formula

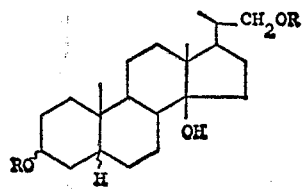

wherein R is alkanoyl, or aralkanoyl or hydrogen.

No references cited.

HENRY A. FRENCH, Primary Examiner

U.S. Cl. X.R.

260—239.57, 397.45, 397.5